United States Patent
Miyazaki et al.

(10) Patent No.: US 6,542,459 B2
(45) Date of Patent: Apr. 1, 2003

(54) CARTRIDGE AND MANUFACTURING METHOD THEREOF

(75) Inventors: Yukio Miyazaki, Tokyo (JP); Masaru Ikebe, Tokyo (JP); Kouichi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/321,117

(22) Filed: May 27, 1999

(65) Prior Publication Data

US 2002/0109940 A1 Aug. 15, 2002

(30) Foreign Application Priority Data

May 28, 1998 (JP) .......................... 10-162815
Oct. 29, 1998 (JP) .......................... 10-322962
Jan. 22, 1999 (JP) .......................... 11-13754

(51) Int. Cl.[7] .............................. G11B 23/03
(52) U.S. Cl. ................................ 369/291
(58) Field of Search ........................ 360/132, 133; 369/291

(56) References Cited

U.S. PATENT DOCUMENTS

| | | | | |
|---|---|---|---|---|
| 5,226,035 A | * | 7/1993 | Kato et al. ............. | 369/291 |
| 5,325,256 A | | 6/1994 | Miyazaki et al. | |
| 5,524,005 A | | 6/1996 | Ikebe et al. | |
| 6,086,992 A | * | 7/2000 | Kato et al. ............. | 428/336 |

FOREIGN PATENT DOCUMENTS

| EP | 0 524 824 | 1/1993 | | |
|---|---|---|---|---|
| JP | 61-170972 | 8/1986 | | |
| JP | 1-286190 | * | 11/1989 | |
| JP | 03207066 A | * | 9/1991 | ........ G11B/23/03 |
| JP | 4-176070 | * | 6/1992 | |
| JP | 5-334839 | * | 12/1993 | |
| JP | 6-325533 | | 11/1994 | |
| JP | 6-346178 | | 12/1994 | |
| JP | 7-153220 | | 6/1995 | |
| JP | 8-306155 | | 11/1996 | |
| JP | 9-17141 | * | 1/1997 | |
| JP | 10-64223 | * | 3/1998 | |
| JP | 10-106215 | * | 4/1998 | |
| JP | 10-233074 | * | 9/1998 | |
| JP | 10-272724 | * | 10/1998 | |

OTHER PUBLICATIONS

Patent Abstracts of Japan, vol. 1998, No. 11, Sep. 30, 1998, JP 10-162541, Jun. 19, 1998.
Patent Abstracts of Japan, vol. 1996, No. 03, Mar. 29, 1996, JP 07 312 053, Nov. 28, 1995.

* cited by examiner

*Primary Examiner*—William Klimowicz
(74) *Attorney, Agent, or Firm*—Oblon, Spivak, McClelland, Maier & Neustadt, P.C.

(57) ABSTRACT

A cartridge accommodates a recording medium etc, and includes an opening and a shutter for opening and closing the opening. The shutter surface is formed with a hole with which an external drive member engages for driving the shutter. An inner side peripheral surface of the hole, upon which at least the drive member impinges when opening and closing the opening, is constructed of a bending portion continuous from the shutter surface. The bending portion can be worked as a continuous surface by punching out a prepared hole so as to leave a portion corresponding to the bending portion and thereafter bending it. A resinous protection layer having a thickness more than 12 μm is provided on the shutter surface upon which the drive member impinges when engaging with the hole.

8 Claims, 11 Drawing Sheets

CARTRIDGE AND MANUFACTURING METHOD THEREOF

BACKGROUND OF THE INVENTION

1. Filed of the Invention

The present invention relates generally to a cartridge for accommodating a recording medium taking a disk-like shape and a member for cleaning, etc. and a manufacturing method thereof, and more particularly to an improvement of a shutter provided in the cartridge and a manufacturing method thereof.

2. Description of the Prior Art

A recording medium cartridge such as a mini disk cartridge (MD) accommodating a recording medium has a rectangular storage case in which a recording medium having a disk-like shape or the like is encased. The storage case is formed with an opening for inserting a head when in recording/reproducing processes, and a shutter for provided for opening and closing this opening. FIGS. 5A and 5B show an example of a prior art MD cartridge-oriented shutter. FIG. 5A is a top view of the shutter, wherein an upper plate 102a and a lower plate 102b of the shutter 102 are disposed so that the storage case of the mini disk cartridge is sandwiched in between the upper and lower plates 102a, 102b in a vertical direction on the drawing. FIG. 5B is a sectional view thereof. As illustrated in FIG. 5B, a top plate 103 for connecting the upper and lower plates 102a, 102b is formed with a rectangular opening 100 through which to insert a shutter opening/closing member of the apparatus in order to drive the shutter 102 open and shut. A side end surface 101 of the opening 100 is normally formed by a punch-out work and therefore has a cut surface.

Stainless steel has hitherto been used for composing the above-described shutter, however, it can be considered that, for example, an aluminum material is used as disclosed in Japanese Patent Application Laid-Open No.6-346178. What is proposed in this publication is that a resinous layer is provided on the surface of an aluminum alloy in order to enhance a strength, an anti-corrosion and a sliding property etc.

The aluminum material has, if used, an advantage of being capable of reducing both a weight and a cost of the cartridge on the other hand, and has, because of its hardness being small, the following problem. This problem is explained referring to FIG. 6. A shutter opening/closing member 105 moves in a direction b as indicated by the solid line in FIG. 6 in order to drive the shutter 102 so as to open and close the shutter 102, and, with an approach to an opening 100 of a shutter 102, rotates in a direction a, and its tip portion 105a enters the opening 100 as indicated by the broken line in FIG. 6. At this time, the tip 105a of the shutter opening/closing member, 105 impinges upon a side end surface 101 to cause a frictional force. The aluminum material is lower in terms of the hardness than the stainless steel, and, the side end surface 101 being formed as a cut surface by a punch-out work, the side end surface 101 might be chipped by the shutter opening/closing member 105 sliding on the tip 105a. The quantity of the chip of the side end surface 101 becomes larger with more repetitions of the opening/closing operations of the shutter 102. Metal powders caused by the chips are hard to be discharged from the cartridge and an apparatus as well, which might induce inconveniences (such as a sound skip and a drop-out attributed to a damage to the disk) when in recording/ reproducing processes. Consequently, there might also arise a possibility of exerting an adverse influence.

Even in the case of using the aluminum alloy provided with the resinous layer as disclosed in Japanese Patent Application Laid-Open No.6-346178, the opening 100 is formed after providing the resinous layer, and hence the inner side peripheral end surface of the opening is chipped as it used to be because of no resinous layer provided thereon.

Further, as indicated by the solid line in FIG. 6, the shutter opening/closing member 105 is driven for driving the shutter 102 so as to open and close the shutter 102, and moves in an arrow direction b toward the opening 100 while contacting a surface 103a of a top plate 103 of the shutter 102 in an area D indicted by the broken line in FIG. 5A. With this movement, the tip 105a of the shutter opening/closing member 105 causes a frictional force against the surface 103a of the top plate 103 in the area D, and further impinges upon the side end surface 101 of the opening 100 enough to cause the frictional force. The shutter opening/closing member 105 reciprocates in the direction b in FIG. 6 and in a reverse direction b' thereto, and, with the aluminum material being less in its hardness than the stainless steel with the shutter opening/closing member 105 repeatedly sliding on the surface 103a, the surface 103a of the top plate 103 might be chipped in the area D. A quantity of the chip of the surface 103 and the like becomes larger with a greater number of repetitions of the opening/closing operation of the shutter 102, and there might be a possibility in which the metal powders caused by the chips thereof induce the drop-out or the like when in the recording/reproducing processes as in the case described above.

On the other hand, Japanese Patent Application Laid-Open No.8-3061155 discloses that a shutter composed of an aluminum alloy is coated with a layer for preventing a polyethylene film from being adhered to the shutter. Further, Japanese Patent Application Laid-Open No.5-41055 discloses that the surface of the stainless steel shutter is provided with a protective resinous layer for preventing a damage and adhesions of a fingerprint and an oil film.

Japanese Patent Application Laid-Open No. 8-306155 in which the layer is coated for preventing the adhesion of the materials accommodated therein to the cartridge, however, neither deals with the problem of the chip nor discloses any measures against the chip caused by the sliding of the shutter opening/closing member of the apparatus. Moreover, Japanese Patent Application Laid-Open No. 5-41055, in which the protective resinous layer for preventing a damage to the shutter is provided, is intended to cope with a friction of the shutter which occurs by accident when cases are stacked, but does not disclose any measure against the chip enough to the problem of the chip due to the slide of the shutter opening/closing member of the apparatus.

SUMMARY OF THE INVENTION

It is a primary object of the present invention to provide a cartridge and a manufacturing method thereof that are capable of preventing a chip in a hole of a shutter into which a shutter opening/closing member of an apparatus enters even when the shutter is composed of a light metal material having low hardness such as aluminum and the like.

It is another object of the present invention to provide a cartridge capable of reducing a chip on a shutter surface which is caused by repetitive sliding actions between the shutter and the shutter opening/closing member of the apparatus even when the shutter of composed of the light metal material having the low hardness such as aluminum or the like.

To accomplish the above objects, according to one aspect of the invention, a cartridge for accommodating a tape-like member or a disk-like member, is provided with a case, an opening formed in the case, a shutter for opening and closing the opening, and a hole, formed in a surface of the shutter, with which an external drive member engages to drive the shutter, wherein the inner side peripheral surface of the hole, with which at least the drive member comes in contact when opening and closing the opening, is formed of a continuous surface continuous from the shutter surface.

According to the cartridge described above, when the drive member, for driving the shutter of the external apparatus and the like engages with the hole of the shutter, the inner side peripheral surface of the hole upon which the drive member impinges is the continuous surface continuous from the shutter surface but is not a cut surface as in the prior art, and hence the quantity of the chip can be decreased. Magnetic recording mediums of a magnetic type, an optical type and an magneto-optic type and the like, and a member for cleaning may be each exemplified as the tape-like member or the disk-like member accommodated in the cartridge. With those accommodated therein, the recording medium cartridge and the cleaning member can be each constructed.

The continuous surface is formed in a curved shape in the vicinity of the shutter surface, thereby enlarging a contact area of this curved portion with the drive member. The continuous surface has no angular portion upon which the drive member impinges, and therefore a slide resistance between the curved portion and the drive member decreases, whereby the quantity of the chip on the inner side peripheral surface of the hole can be largely reduced.

The shutter includes a pair of flat plates positioned respectively on both surfaces of the cartridge, and a connection plate for connecting the flat plates, and the connection plate may be provided with the hole.

The hole may be formed in a rectangular shape. In this case, a pair of the continuous surfaces may be provided on the inner side peripheral surfaces, facing to each other, of the rectangular hole. With this contrivance, even if the drive member impinges on any one of the face-to-face inner side peripheral surfaces of the hole, the same effect as the above can be exhibited. The continuous surface may be provided on two other surfaces facing to each other, and totally two pairs of the surfaces may also be provided.

The continuous surface may be formed by its being bent from the shutter surface. This bending facilitates the formation of the continuous surface, and the continuous surface may be formed in a curved shape in the vicinity of the shutter surface. Further, when one or two pairs of the continuous surfaces are provided in the face-to-face relationship, these continuous surfaces can be formed by the bending process.

A bending angle of the continuous surface is over 90 degrees to the shutter surface, whereby the drive member becomes hard to impinge upon the side end of the inner side peripheral surface of the underside of the shutter. The problem of the chip caused by the drive member does not occur at this side end.

The shutter may be composed of a light metal material. The above-described construction of the shutter obviates the problem of the chip on the inner side peripheral surface of the hole, and therefore the chip can be restrained even if composed of the light metal material having the low hardness. It is therefore feasible to reduce both the weight and the cost of the cartridge by the shutter being composed of the light metal material. Aluminum (Al), magnesium (Mg), titanium (Ti), beryllium (Be), and light metal materials such as alloys of these metals may be each exemplified as the light metal material.

According to another of the invention, there is provided a method of manufacturing a cartridge, for accommodating a tape-like member or a disk-like member, constructed of a case, an opening formed in the case, a shutter for opening and closing the opening, and a hole, formed in a surface of the shutter, with which an external drive member engages to drive the shutter, an inner side peripheral surface of the hole, with which at least the drive member comes in contact when opening and closing the opening, formed of a continuous surface continuous from the shutter surface. This method includes the steps of forming a starting hole with a portion corresponding to the continuous surface being left in a punch-out work for forming the hole of the shutter, and forming the hole by bending the portion corresponding to the continuous surface.

According to the manufacturing method described above, the starting hole is formed with the portion corresponding to the continuous surface being left. Next, the portion, corresponding to the continuous surface, of the starting hole is bent, whereby the above continuous surface can be formed on the inner side peripheral surface of the hole of the shutter. The continuous surface can be thereby formed in the hole by the simple steps.

The hole may be rectangular, the portion corresponding to the continuous surface may be provided on each of two sides facing to each other, and the portions corresponding to the continuous surface may be bent on the two sides. With this configuration, a bending force is preferably applied to the material with a well force balance when the hole is subjected to a bending work by a die assembly. Further, when the portion corresponding to the continuous surface is provided on each of four sides, and the portions corresponding to the continuous surface may be bent on the four sides.

When punching out the starting hole, the slit portions or punch-out portions may be formed at the side ends of the portion corresponding to the continuous surface, thereby facilitating the bending work in the hole. Further, the shutter material can be prevented from stretched out at a corner of the starting hole, which is believed to be preferable.

The hole may be formed by inserting a die member assuming a configuration corresponding to the configuration of the hole into the starting hole. Further, the shutter may be composed of a light metal material.

According to further aspect of the invention, a cartridge for accommodating a tape-like member or a disk-like member, is provided with a case, an opening formed in the case, a shutter, composed of a light metal material, for opening and closing the opening, and a hole, formed in a surface of the shutter, with which an external drive member engages to drive the shutter, wherein a resinous protection layer having a thickness of more than 12 $\mu$m is provided on the surface of the shutter upon which the drive member impinges when engaging with the hole, and contains a lubricating agent within a range of 2 to 10.5% by weight.

According to investigation of the prevent inventors, the resinous protection layer having a thickness more than 12 $\mu$m is provided on the surface at which the drive member of the external apparatus impinges upon the shutter, thereby making it feasible to effectively reduce the chip produced with the repetitive sliding actions of the drive member on the shutter surface. It has proven that the effectiveness increases if the thickness is more than 15 $\mu$m. A polyester series resin, an epoxy series resin and an acrylic series resin can be used as a resin material of the resinous protection layer, however, the present invention is not limited to those materials. Moreover, the portion of the shutter, provided with the resinous protection layer, may exist within a range where at least the drive member of the apparatus impinges thereon but may be provided in other areas. Further, the magnetic recording mediums of the magnetic type, the optical type and the magneto-optic type and the like, and the member for cleaning may be each exemplified as the tape-like member or the disk-like member accommodated in the cartridge. With those accommodated therein, the recording medium cartridge and the cleaning member can be each constructed.

The resinous protection layer contains 2 to 10.5% lubricating agent by weight, preferably, 3 to 10.5% lubricating agent by weight, thereby improving a sliding property of the drive member on the shutter surface and making is possible it further reduce the chip caused by sliding of the drive member on the shutter surface. If the content quantity of the lubricating agent is less than 2% by weight, a satisfactory sliding property can not be obtained on the resinous protection layer. Further, if over 10.5% by weight, adhesion of the resinous protection layer to the shutter declines and such is therefore easy to exfoliate. In addition, a printing property with respect to the shutter is deteriorated. Note that polyethylene fluoride, silicon and molybdenum disulfide may be each used as a material of the lubricating agent, however, the present invention is confined to these materials.

It is preferable that the thickness of the resinous protection layer on the surface of the shutter for opening and closing the opening be less than 40 μm. The functioning of the resinous protection layer becomes far better as the thickness thereof becomes larger. In terms of a relationship with, e.g., a coating step of the resinous protection layer, however, when forming the resinous protection layer also on the outer surface of the shutter at which to open and close the opening, and if the resinous protection layer becomes too thick, the thickness of the whole shutter increases. It is therefore required that the thickness of the material of the shutter be decreased, and as a result a strength of the shutter decreases. Further for avoiding this decrease, a wall thickness of the case of the cartridge fitted with the shutter must be made small, and the strength of the case decreases. It is therefore desirable that the thickness be less than 40 μm.

It is preferable that the inner side peripheral surface of the hole be constructed of the continuous surface continuous from the shutter surface. In this construction, the inner side peripheral surface of the hole, upon which the drive member impinges, is the continuous surface which is continuous from the shutter surface but is not the cut surface as has hitherto existed, and hence the inner side peripheral surface of the hole is chipped by the slide of the drive member with a difficulty. Then, the quantity of the chip can be reduced.

The continuous surface is formed in the curved shape in the vicinity of the shutter surface, whereby a contact area of the drive member with the curved portion can be enlarged. There is no angular portion upon which the drive member impinges, and therefore the slide resistance of the drive member on the curved portion is decreased, and the quantity of the chip on the inner side peripheral surface of the hole can be largely reduced, which is conceived preferable.

The continuous surface may be so formed as to be bent from the shutter surface. With this bending, the continuous surface can be easily formed, and may be formed with a curved shape in the vicinity of the shutter surface.

The shutter is composed of the light metal material, thereby obviating the problem of a chip on the inner side peripheral surface of the hole as well as on the shutter surface. It is therefore possible to effectively restrain the chip even when composed of the light metal material having the low hardness.

Other features and advantages of the present invention will become readily apparent from the following description taken in conjunction with the accompanying drawings.

BRIEF DESCRIPTION OF THE DRAWINGS

FIGS. 8A through 8C are explanatory views showing a method of manufacturing the shutter in this embodiment wherein FIG. 8A is a top view showing another starting hole formed in the connection plate; FIG. 8B is a side view showing a step of a bending work thereof and FIG. 8C is a perspective view showing a bent portion subjected to the bending work;

DESCRIPTION OF THE PREFERRED EMBODIMENTS

Figure 1:
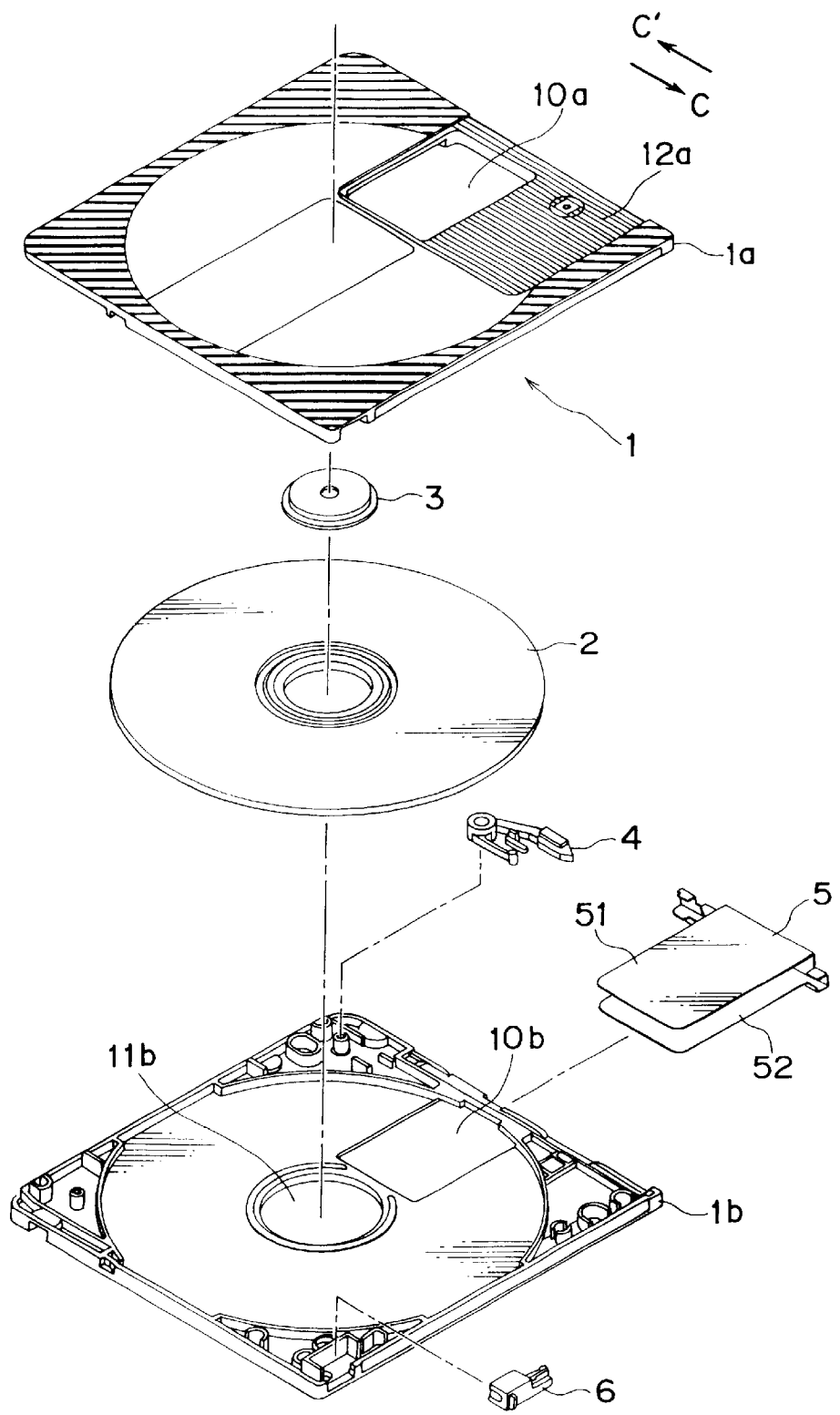
FIG. 1 is an exploded perspective view showing respective components of a mini disk cartridge in an embodiment of the present invention.

Embodiments of the present invention will hereinafter be described with reference to the accompanying drawings. FIG. 1 is an exploded perspective view showing the whole of a minidisk cartridge (MD) classified as a recording medium cartridge in the embodiment of the present invention. FIGS. 2A to 2D are views each showing a shutter of the mini disk cartridge in FIG. 1.

As illustrated in FIG. 1, a mini disk cartridge 1 is constructed of an upper case 1a formed of a resin in a rectangular plane shape, a lower case 1b having the same configuration, and a shutter 5 for opening and closing head insertion holes holed in upper and lower cases 1a, 1b. A disk 2 serving as a recording medium is rotatably interposed between the upper case 1a and the lower case 1b. The upper case 1a is provided with a slide area 12a recessed from an outer surface of the upper case 1a so that the shutter 5 slides in a direction c and a direction c opposite thereto in FIG. 1. The slide area 12a is formed with a rectangular head insertion hole 10a through which is insertable a head of the apparatus when the mini disk cartridge 1 is loaded into the external apparatus for recording or reproducing. Further, the lower case 1b is likewise provided with a slide area (not shown) for the shutter 5 in the same range, and a head insertion hole 10b is formed in a position corresponding to the head insertion hole 10a of the upper case 1a within the above slide area.

Moreover, the lower case 1b is formed with a drive shaft insertion hole 11b into which a drive shaft of the external apparatus is inserted for rotationally driving the disk 2 through a hub member 3 when in recording/reproducing processes. Further, a shutter lock 4 and a plug 6 for preventing deletion of the record are, as shown in FIG. 1, disposed within the mini disk cartridge 1.

Next, the shutter 5 is explained with reference to FIGS. 2A to 2D. As illustrated in the perspective view of FIG. 1, a front view of FIG. 2A, a top view of FIG. 2B and a bottom view of FIG. 2D, the shutter 5 is constructed integrally of an upper plate 51 assuming a configuration suited to cover the head insertion hole 10a of the upper case 1a in a closed state, a lower plate 52 assuming a configuration suited to cover the head insertion hole 10b of the lower case 1b in the closed state, and a connection plate 53 for connecting the upper and lower cases 51,52. The shutter 5 is structured so as to form a ⊐-like shape in section so that that the upper and lower cases 1a, 1b are sandwiched in between the upper plate 51 and the lower plate 52, and that the connection plate 53 faces to a side surface of the mini disk cartridge 1. Further, the shutter 5 is composed of an Al—Mg series aluminum alloy containing 4.0 to 5.0% Mg.

Detachment preventive pawls 56a, 56b are formed in the vicinity of the connection plate 53 at both side ends of the lower plate 52, and engage in a slidable manner with a groove (unillustrated) formed in an outer surface of the lower case 1b. Further, guide pieces 57a, 57b protrude downward in FIG. 2A from extended members 58, 59 extending from both side ends of the connection plate 53 so that the guide pieces 57a, 57b face the detachment preventive pawls 56a, 56b. The guide pieces 57a, 57b engage in the slidable manner with a groove (not shown) formed in a side surface of the mini disk cartridge 1. The detachment preventive pawls 56a, 56b and the guide pieces 57a, 57b are fitted in the respective grooves, and are so disposed as to surround the side end surfaces of the lower case 1b, whereby the shutter 5 is prevented from becoming detached from the mini disk cartridge 1. At the extended member 58 of the connection plate 53, an engagement piece 55 is provided protruding downward in FIG. 2A in a position more extending than the guide piece 57a. The engagement piece 55, when the shutter 5 is closed, engages with the shutter lock 4 shown in FIG. 1, thereby locking the shutter 5 in the closed state and preventing the shutter 5 from opening unexpectedly.

Figure 2A:
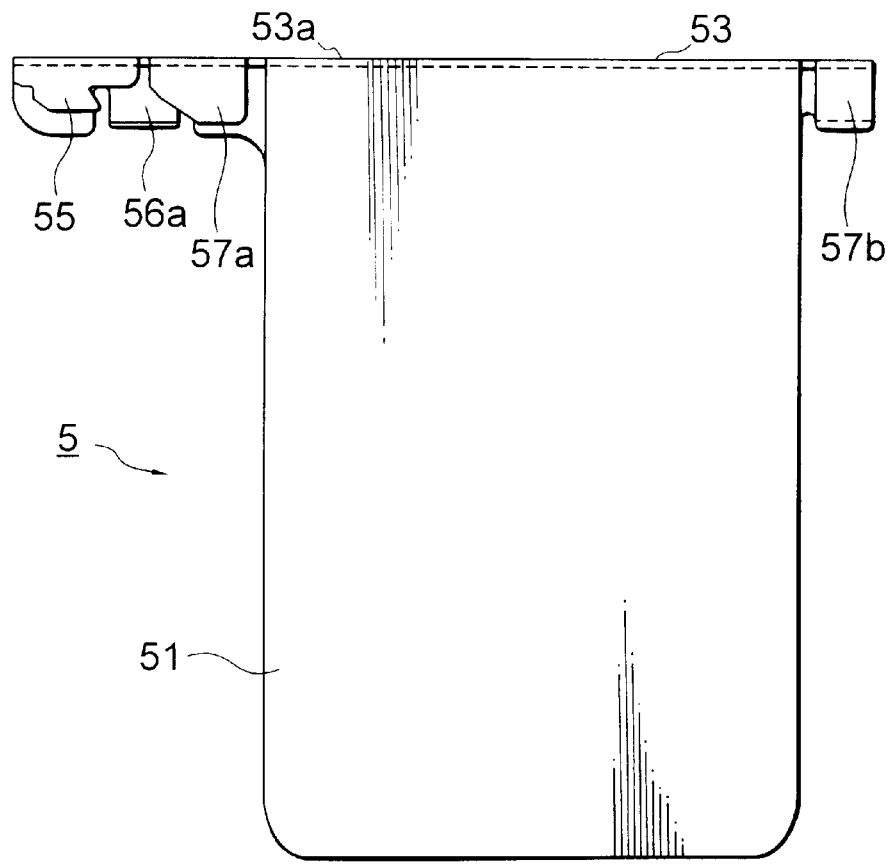
FIG. 2A is a front view of a shutter of the mini disk cartridge in FIG. 1.
Figure 2B:
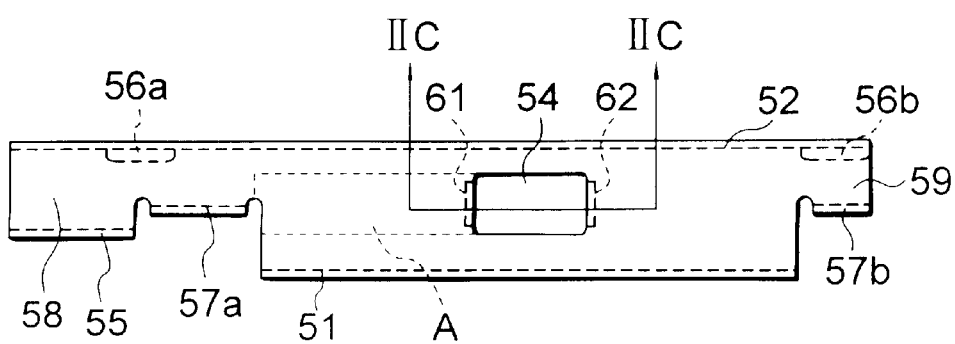
FIG. 2B is a top view thereof.
Figure 2C:
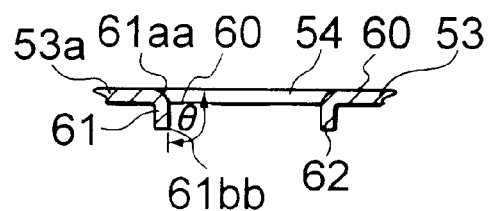
FIG. 2C is a sectional view taken along the line IIC—IIC in FIG. 2B.
Figure 2D:
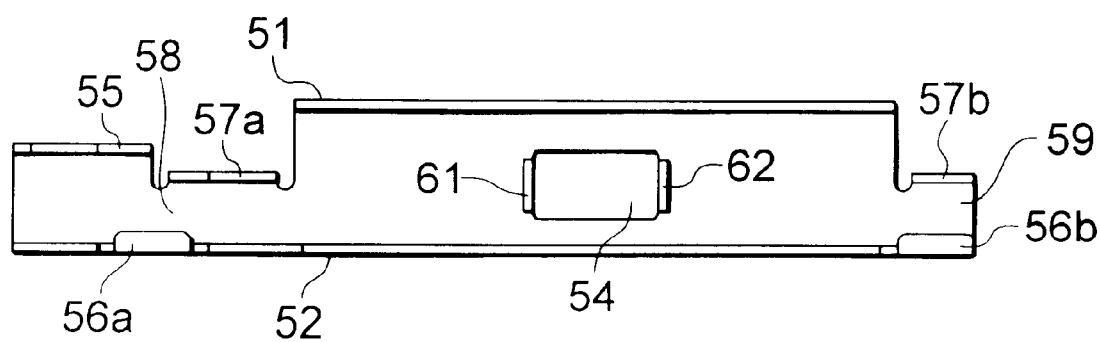
FIG. 2D is a bottom view thereof.

As shown in FIGS. 2B and 2D, a rectangular hole 54, with which a shutter opening/closing member of the external apparatus engages, is formed substantially in a central portion in the longitudinal direction of the connection plate 53 of the shutter 5. As illustrated in the sectional view of FIG. 2C, bending portions 61, 62 are so formed as to be bent toward the side surface of the mini disk cartridge 1, extending respectively from a short side with which the shutter opening/closing member comes into contact when entering and a short side facing to the former short side among four sides of the inner side peripheral surface of the hole 54. The inner peripheral side surfaces of the hole 54, which are defined by the bending portions 61, 62, extend in continuation from a surface 53a of the connection plate 53 of the shutter 5. Further, with the bending thereof, the bending portion 61 has a curved round surface 61aa formed in the vicinity of the surface 53a of the connection plate 53. Furthermore, the bending portion 61 is bent at a bending angle θ of 90 degrees or greater to the surface 53a of the connection plate 53. The bending portions 61, 62 protrude toward the side surface of the mini disk cartridge 1, however, a length of each protrusion thereof is set so as not to come into contact with the side surfaces of the mini disk cartridge 1, which are shaped by the upper case 1a and the lower case 1b.

Figure 7:
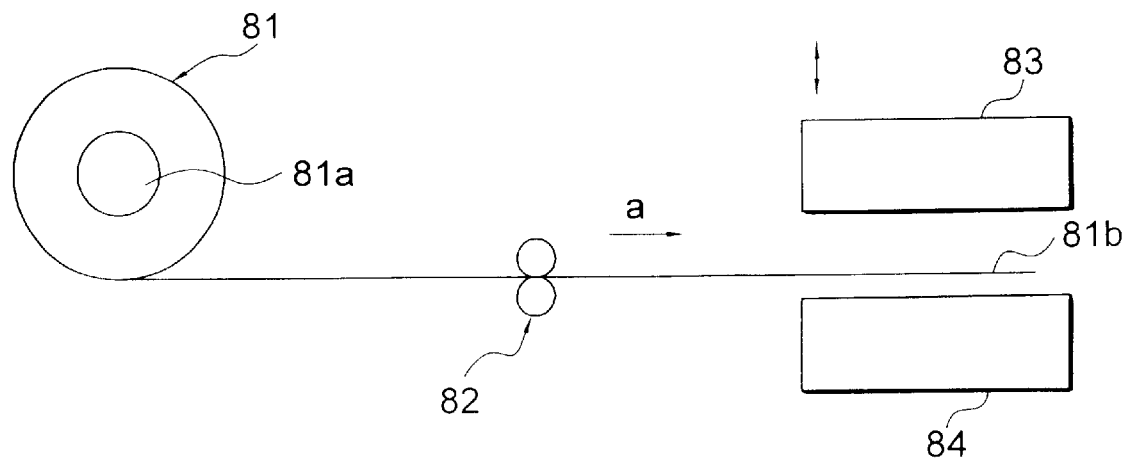
FIG. 7 is a view schematically showing a press working apparatus capable of manufacturing the shutter in this embodiment.

Next, a method of manufacturing the shutter 5 described above will be explained with reference to FIGS. 3A to 3D and FIGS. 7 to 10. To start with, a manufacturing apparatus applicable to the shutter manufacturing method in this embodiment will be described referring to FIG. 7. The manufacturing apparatus shown in FIG. 7 is classified as a press working apparatus by which a band-like strip 81b composed of aluminum is fed in a direction a by a couple of rollers 82 from a coil 81 composed of an aluminum band-like strip wound on a winding core 81a, during which the strip 81b is subjected to press-working in a predetermined configuration by a top die 83 of a press die assembly movable for every press operation in the vertical direction in FIG. 7, and by a fixed bottom die 84 thereof.

Figure 5A:
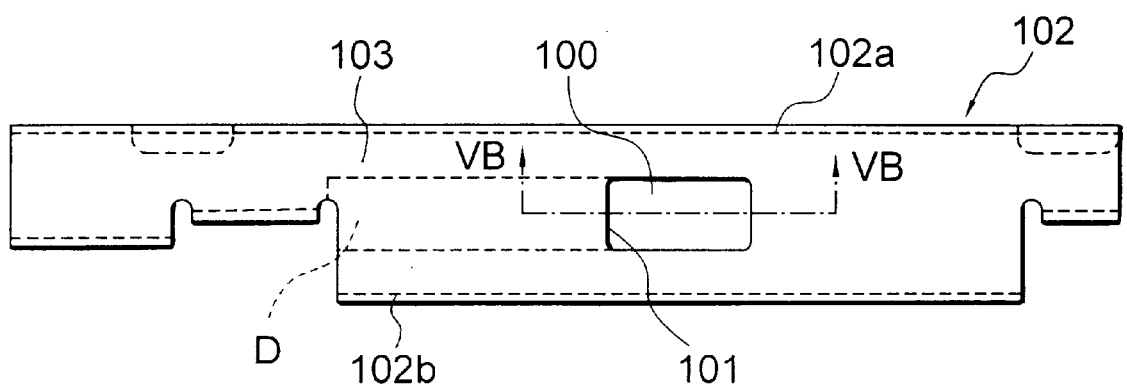
FIG. 5A is a top view of the shutter of a conventional mini disk cartridge.
Figure 5B:
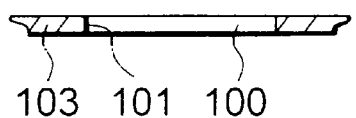
FIG. 5B is a sectional view taken along the line VB—VB.
Figure 6:
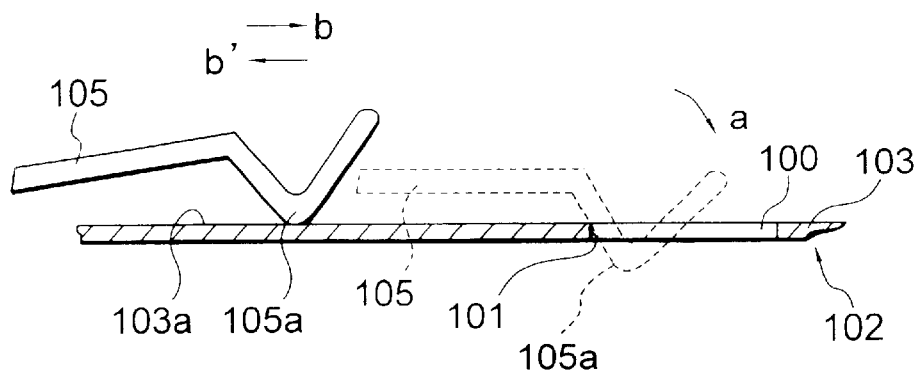
FIG. 6 is an explanatory sectional view showing problems on the shutter surface of the mini disk cartridge as well as in the hole in the prior art.

A feeding mechanism constructed of the roller coupling 82 performs an intermittent feeding operation synchronized with a motion of the top die 83 so that the band-like strip 81b is fed in the direction a while the top die 83 remains separated from the bottom die 84. The band-like strip 81b is moved at a predetermined pitch within an area between the top die 83 and the bottom die 84 of the press die assembly, during which the strip 81b is press-worked a plurality of times in sequence into a desired configuration (punch-out work), and moved to a next process. Subsequently, bending work is carried out a plurality of times in sequence by another mold (not shown) in the die assembly till ⊐-shape is formed as seen in the shutter 5 in FIG. 5 (bending work). Thereafter, separation lines of a plurality of shutters are separated (separating work), thereby completing the shutter. The operation of executing the press working while progressively feeding the press working material, is referred to as progressive working. The progressive working exhibits a high productivity and is suited to a production of small-sized products such as the shutter.

Given next is an explanation of a method of working the hole 54 of the shutter 54 by use of a press working apparatus including the press dies 83, 84 described above. The working for forming the hole 54 is effected when in the punch-out work described above.

Figure 3A:
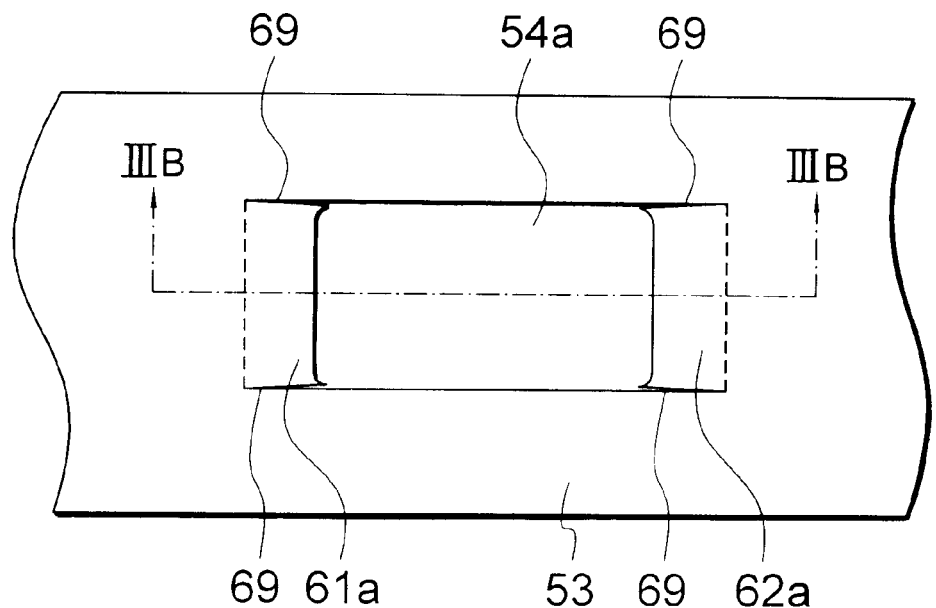
FIG. 3A is an explanatory top view of a connection plate, showing a method of manufacturing the shutter in FIG. 2A.

In an example shown in FIGS. 3A to 3D, the connection plate 53 of the shutter 5 shown in FIG. 2B is, as shown in FIG. 3A, punched out to form a hole 54a serving as a starting hole so that portions 61a, 62a corresponding to the bending portions 61, 62 are left, and, when in this punch-out process, rectilinear slits 69 are formed in four position between the connection plate 53 and the portions 61a, 62a. Next, the portions 61a, 62a corresponding to the bending portions 61, 62 are bent in a direction d in FIG. 3B, thereby forming the bending portions 61, 62 as illustrated in FIGS. 2B and 2C with the result that the hole 54 is thus formed.

Figure 3B:
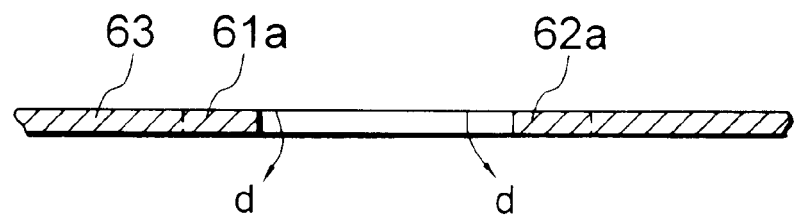
FIG. 3B is a side view thereof.
Figure 3C:
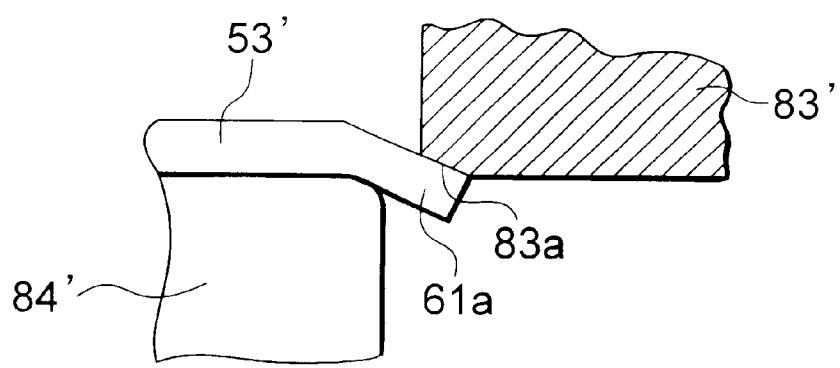
FIGS. 3C and 3D are side views each showing a step of executing bending work in a hole by use of a top die and a bottom die.
Figure 3D:
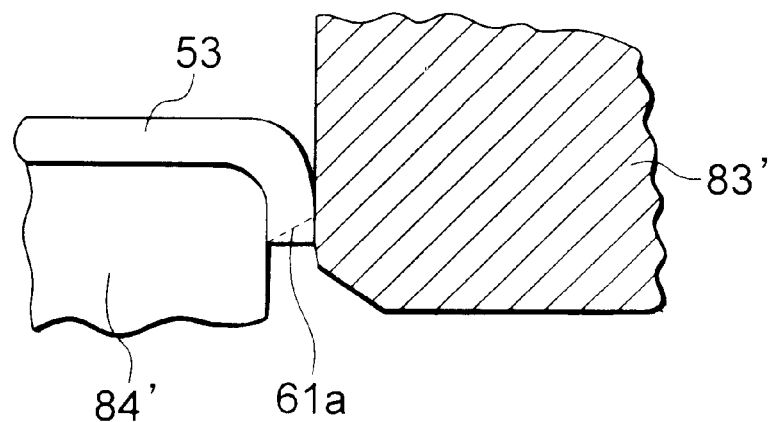

The portions 61a, 62a are bent in such a way that the connection plate is, to be specific, as shown in FIG. 3C, fixed to a bottom die 84' of the press die assembly, in which state a top die 83', of the press die assembly, having a configuration corresponding to the configuration of the hole 53 to be formed begins to press the portion 61a (with the portion 62a being pressed the same) of the connection plate 53 with a tapered portion 83a thereof, and further forces it downward as shown in FIG. 3D, thus bending the portion 61a substantially at a right-angle. Incidentally, the bending angle is insufficient in this bending process, the bending work is done once again. As discussed above, the hole 54 of the connection plate 53 of the shutter 5 can be formed with the continuous surfaces by the simple processes, and besides it is feasible to attain the method of manufacturing the shutter with high productivity because of simply adding the bending process.

The bending portion 62 in FIG. 3A may be omitted if shutter opening/closing member does not impinge thereon, but is provided taking into consideration a force balance when in the bending work in this embodiment. Namely, as shown in FIG. 3B, the bending force is applied to the shutter 5 with a better force balance by a method of simultaneously bending both of the portions 61a, 62a facing to each other than by a method of bending only the portion 61a, which is preferable in terms of being capable of preventing a deformation during the working for forming the hole 54 of the shutter 5. Further, the bending portions may be provided on the four sides of the hole 54 in terms of a balance when in this working.

Further, the rectilinear slits 69 shown in FIG. 3A facilitate the bending work described above and may also be formed after the punch-out work for the hole 54a. Moreover, the slits 69 may be formed along the entire lengths of the bending portions 61, 62 and may also be formed not to the entire lengths thereof but partially, or may be omitted if there is no problem in the bending work.

Figure 8A:
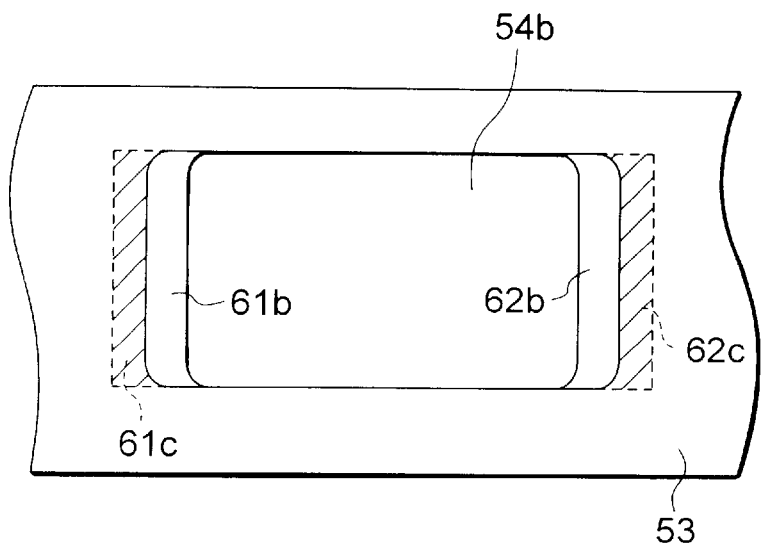
Figure 8B:
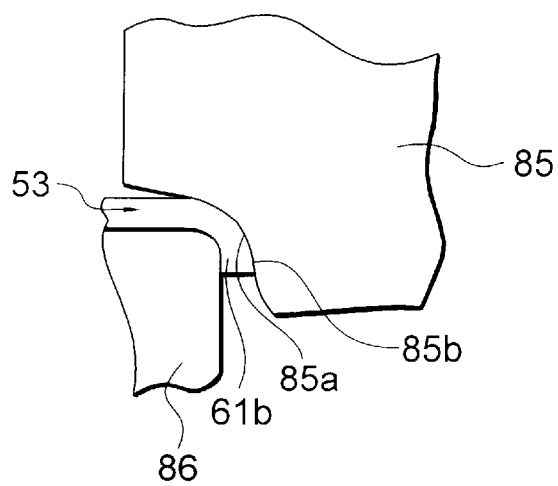
Figure 8C:
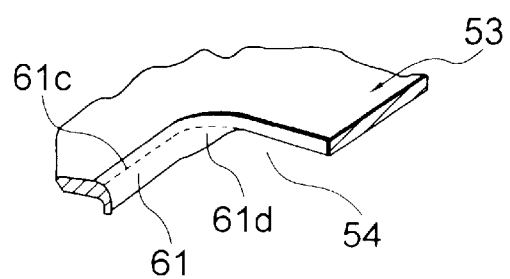

Next, another example will be explained with reference to FIGS. 8A to 8C. In this example, the work for slit as illustrated in FIG. 3A is not performed. To begin with, the connection plate 53 of the shutter 5 is, as shown in FIG. 8A, punched out to form a hole 54b serving as a starting hole so that portions 61a, 62a corresponding to the bending portions 61, 62 are left. Next, as shown in FIG. 8B, in a state where the connection plate 53 is fixed to the bottom die 86 of the press die assembly, the top die 85 of the press die assembly lowers while forcing the portion 61b (and the portion 62b as well) of the connection plate 53, thereby bending the portion 61b substantially at the right-angle with a curved surface 85a taking a concave shape. During this bending process, portions 61c, 62c indicated by oblique lines in FIG. 8A, which are spaced away from the portions 61b and 62b, are also slightly bent with the curved surface 85a. The bending portion 61 thus subjected to the bending work is, as illustrated in FIG. 8C, formed with a radius portion 61d at a corner of the hole 54. The radius portion 61d is formed at each of four corners. A lower portion 85b if the curved surface 85a of the top die 85 constitutes substantially a rectilinear portion as shown in FIG. 8B, and corresponds to a configuration of the hole to be formed.

Figure 9:
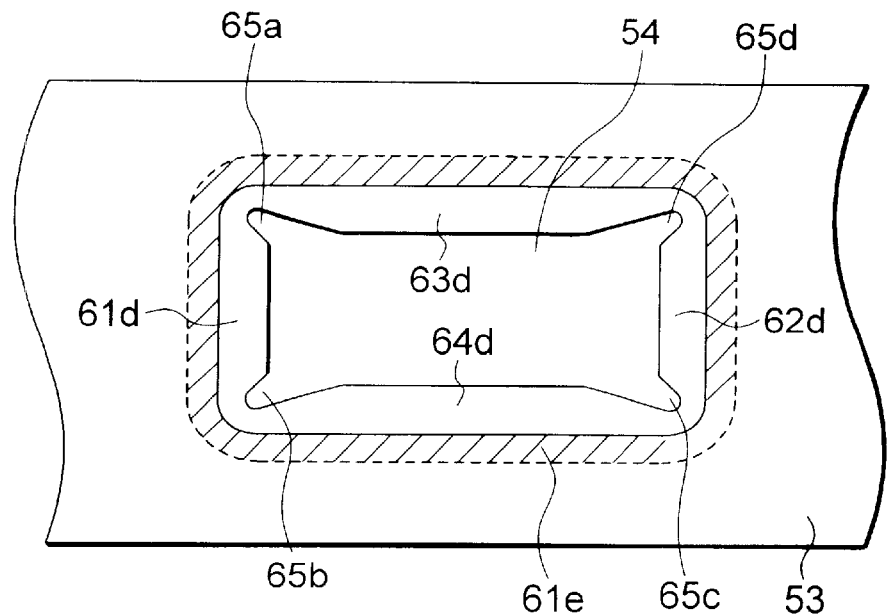
FIG. 9 is an explanatory view showing a method of manufacturing the shutter in this embodiment as well as being a top view showing another starting hole formed in the connection plate.

Next, still another example will be described referring to FIG. 9. In this example, the bending portions are formed on the four circumferential sides of the hole 54(FIG. 2B) of the connection plate 53. That is, as illustrated in FIG. 9, the connection plate 53 is, as shown in FIG. 9, punched out to form a hole 54C serving as a starting hole so that portions 61d, 62d, 63d, 64d corresponding to the bending portions are left, and, rectilinear slits 65a, 65b, 65c, 65d are formed at the four corners of the circumference of the starting hole 54c. After punching out the starting hole 54c having the slits described above, the portions 61d, 62d, 63d, 64d corresponding to the bending portions are bent substantially at the right-angle by the press die assembly, whereby the hole (corresponding to the hole 54 in FIG. 2B) having the bending portions on the four circumferential sides, can be formed in the connection plate 53.

The material is normally stretched out at the four corners of the circumference thereof on the occasion of the above-described bending work, which might be undesirable in terms of its external appearance. In this embodiment, however, the slits 65a, 65b, 65c, 65d are previously formed, which is therefore capable of preventing such a drawback that the external appearance is to be spoiled due to the material being stretched out. Further, when bending the portions 61d, 62d, 63d, 64d, the portion 61e indicated by the oblique lines is somewhat bent. Moreover, the top die of the press die assembly assumes the configuration corresponding to the hole to be formed, and expands the starting hole 54c while being inserted in this starting hole 54c, thus forming the hole.

Figure 10:
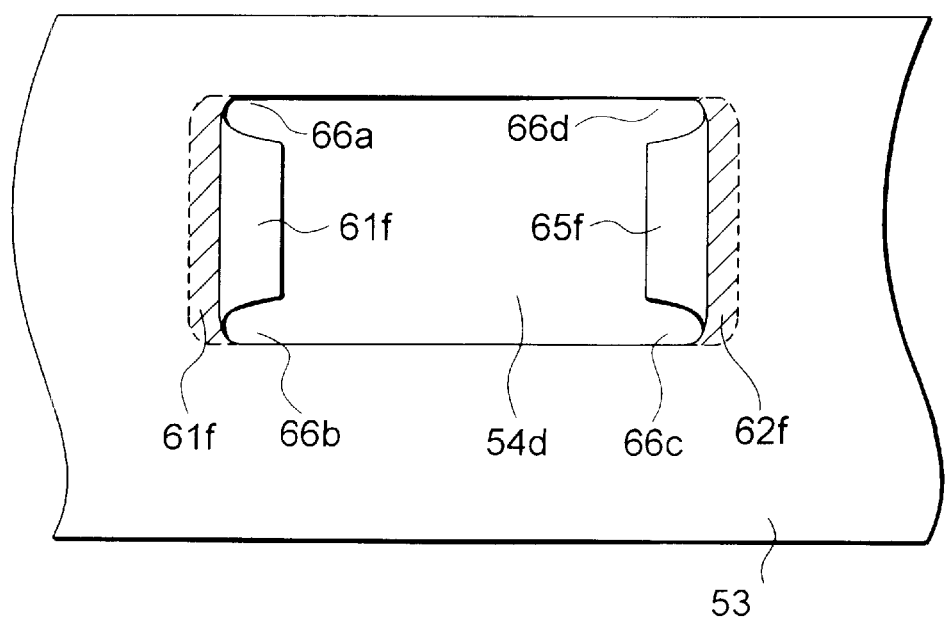
FIG. 10 is an explanatory view showing a method of manufacturing the shutter in this embodiment as well as being a top view showing still another starting hole formed in the connection plate.

Next, a further example thereof will be described with reference to FIG. 10. This example is that although much the same hole as that shown in FIG. 3A is formed as a starting hole, comparatively large slits thereof are formed by the punch-out work. To be specific, as shown in FIG. 10, when punching out a hole 54d as a starting hole in the connection plate 53, portions 61f, 62f corresponding to the bending portions are left, and comparatively large punch-out portions 66a, 66b, 66c, 66d are respectively formed between the connection plate 53 and the portions 61f, 62f. After punching out the hole 54d including the punch-out portions described above, the portions 61f, 62f corresponding to the bending portions are bended substantially at the right-angle by the press die assembly, whereby much the same hole including the punch-out portions as the hole 54 shown in FIG. 2B can be formed in the connection plate 53. It to be noted that slit dimensions (such as widths and lengths) of the slits 65a to 65d in FIG. 9 and the slits 66a to 66d in FIG. 10 may be variable.

Figure 4:
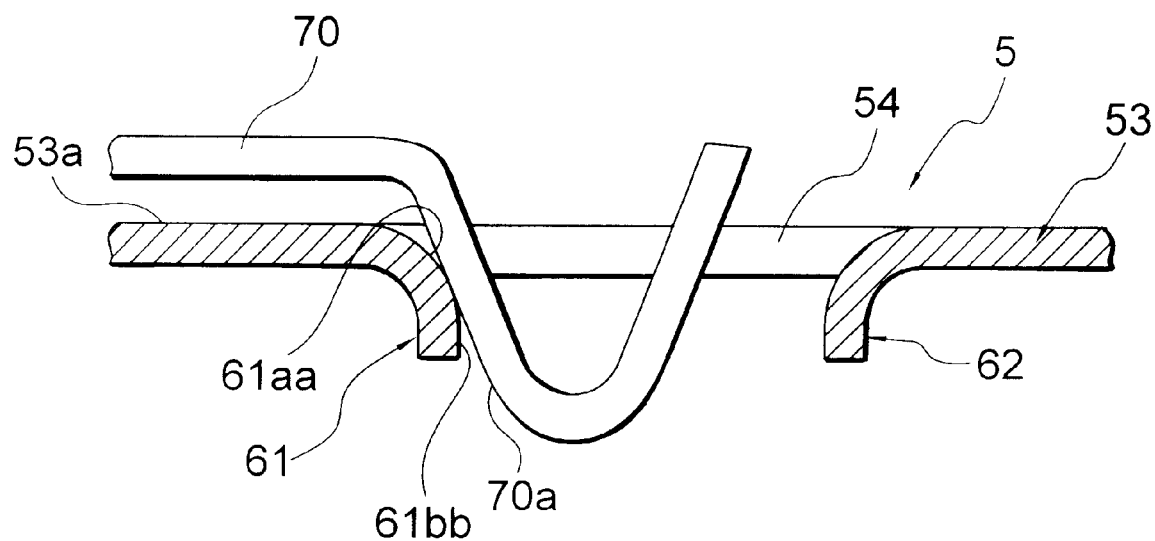
FIG. 4 is an enlarged side view showing the hole of the shutter in FIG. 2C together with a shutter opening/closing member.

Next, an effect of the shutter 5 of the mini disk cartridge 1 described above will be explained referring to FIG. 4. For a recording or reproducing process by the external apparatus, as illustrated in FIG. 4, a shutter opening/closing member of the external apparatus approaches the shutter 5 and enters the hole 54 of the connection plate 53, at which time a V-shaped tip 70a of the shutter opening/closing member 70 comes into contact with the curved surface 61aa, of the bending portion 61, disposed in the vicinity of the surface 53a of the connection plate 53. In this case, the curved surface 61aa of the bending portion 61 is formed in continuation from the connection plate surface 53a and assumes a round shape, and hence there decreases a resistance when the tip 70a slides on the curved surface 61aa, whereby a chip caused by the slide therebetween becomes harder to occur. Then, an increase in area occurs where the tip 70a of the shutter opening/closing member 70 and the curved surface 61aa are closely fitted to each other, and, with the shutter opening/closing member 70, the shutter 5 can be reliably opened and closed with stability in the lateral direction in FIG. 4. Further, the bending angle of the bending portion 61 is set to be 90 degrees or greater, therefore avoiding the occurrence of the V-shaped tip 70a of the shutter opening/closing member 70 impinging upon a tip 61b of the crooked member 61 to cause a chip at this tip 61b.

As discussed above, the bending portion 61 is provided on the inner side peripheral surface of the hole 54 of the shutter 5, thereby making it feasible to highly restrain such a problem inherent in the prior art wherein the cut surface of the inner side peripheral surface of the hole is chipped when the shutter opening/closing member 70 is inserted and engages with the hole 54 to open and close the shutter 5. Even if such operations are repeatedly performed, the quantity of the chip can be reduced. Consequently, the problem of causing the chip can be obviated even when the shutter 5 is composed of an aluminum alloy having hardness lower than the conventional stainless steel, and hence it is possible to decrease the weight of the whole mini disk cartridge and also the costs thereof by using the aluminum alloy and the like to structure the shutter. This has such merit that both of the weight and the cost of the whole mini disk cartridge can be reduced.

The mini disk cartridge has been exemplified as a cartridge in this embodiment. The present invention is not, however, limited to this mini disk cartridge and is applicable to other recording medium cartridges for a floppy disk and a tape recording medium and the like, further to a cleaning cartridge accommodating a cleaning member for cleaning a recording/reproducing head and the like of the external apparatus. This cleaning member may also assume a disk-like or a tape-like configuration. Furthermore, the bending portions may be provided along the entire periphery of the inner side peripheral surface of the hole, and, for example, in the case of the rectangular shape as given in the embodiment discussed above, two pairs of bending portions may also be provided. The hole is not confined to the rectangular shape but may assume other configurations. Furthermore, the material of the shutter involves the use of aluminum, magnesium, titanium, beryllium, and light metal materials such as alloys of these metals, and may, in addition, be other metal materials and non-metallic materials such as polymer resins.

According to the cartridge in this embodiment, even in the case where the shutter is composed of a light metallic material having low hardness such as aluminum, it is feasible to prevent the inner side peripheral surface of the hole from being chipped when the drive member of the apparatus enters the hole during the operations such as the recording/reproducing processes and the like. It is therefore unnecessary to discharge metal powders and the like caused by the chips within the cartridge and the apparatus as well, and an adverse influence thereof can be restrained.

Further, according to the cartridge manufacturing method in this embodiment, the continuous surface described above can be simply formed on the inner side peripheral surface of the shutter hole.

Next, another embodiment of the present invention will be discussed with reference to FIGS. 1, 2A to 2D and 11. In this embodiment, a resinous protection layer is formed on the outer surface of the shutter 5 of the mini disk cartridge shown in FIGS. 1 and 2A to 2D.

As indicated by the broken line in FIG. 2B, a slide area A, in which the shutter opening/closing member of the external apparatus comes into contact and slides, is formed on the surface 53a, on the left side of the hole 54 in the drawing, of the connection plate 53.

Figure 11:
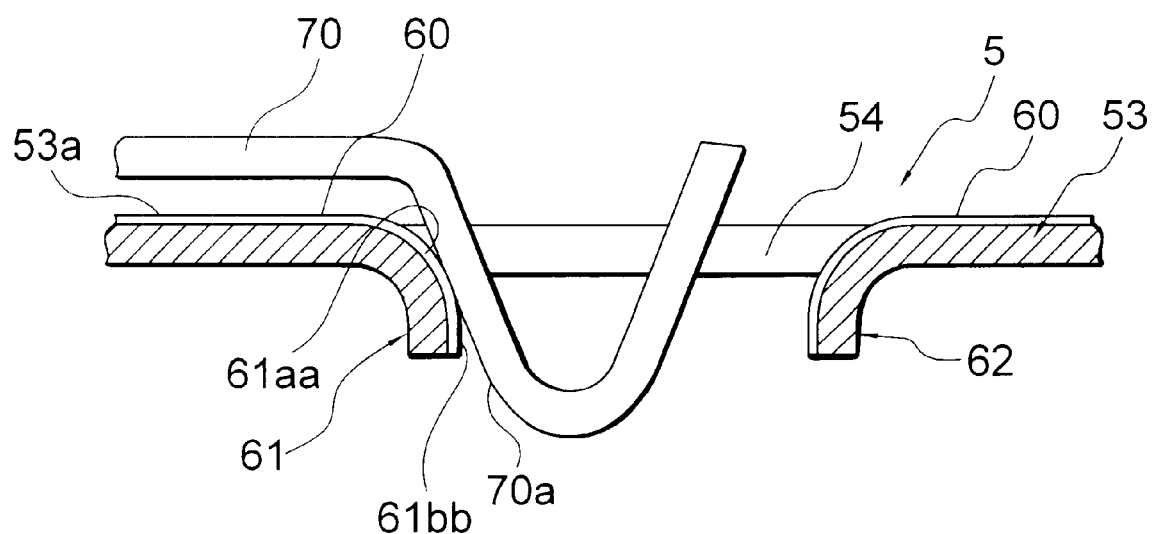
FIG. 11 is a view illustrating another embodiment of the present invention as well as being a sectional view showing the vicinity of the hole of the shutter in FIG. 2C.

A resinous protection layer 60 is, as illustrated in FIGS. 2C and 11, is provided on the outer surface of the shutter 5 shown in FIGS. 2A and 2B. The resinous protection layer 60 is formed having a thickness more than 12 $\mu$m but less than 40 $\mu$m. Further, a 2 to 10.5% lubricating agent by weight is added to the resinous protection layer 60, thereby enhancing a sliding property. The resinous protection layer 60 may also be formed on only the surface 53a of the connection plate 53, or only the slide area A.

Next, the effect of the shutter 5 of the mini disk cartridge 1 described above will be explained. As shown in FIG. 11, the shutter opening/closing member 70 of the external apparatus approaches the shutter 5 in order for the external apparatus to execute the recording or reproducing and comes into contact with the slide area A of the connection plate 53. Then, the shutter opening/closing member 70 moves toward the hole 54 while sliding thereon, and enters the hole 54. Upon an end of the recording and the like, the shutter opening/closing member 70 is brought into contact with the slide area A in the direction opposite to the above direction, and returns while sliding thereon. The shutter opening/closing member 70 repeatedly contacts the slide area A and slides thereon, however, the resinous protection layer 60 has sufficient thickness on the slide area A as compared with the prior art, and the lubricating agent is added thereto enough to enhance the sliding property, and hence there must be no possibility wherein the surface 53a composed of the aluminum alloy might be chipped off.

Further, when the shutter opening/closing member 70 enters the hole 54, the V-shaped tip 70a of the shutter opening/closing member 70 contacts the curved surface 61a in the vicinity of the connection plate surface 53a. At this time, with the curved surface 61a being formed in continuation from the connection plate surface 53a and assuming the round shape, there is a decrease in the resistance caused when the tip 70a slides on the curved surface 61a, and the chip is hardly produced due to the sliding. Moreover, the bending angle θ of the bending portion 61 is set at 90 degrees or larger, and hence the V-shaped tip 70a of the shutter opening/closing member 70 never impinges upon the tip 61b of the bending portion 61 to cause the chip at this tip 61b.

As described above, the slide area A of the connection plate 53 of the shutter 5 is provided with the resinous protection layer 60, thereby making it feasible to reduce the possibility in which the surface 53a is chipped when the shutter opening/closing member 70 contacts the slide area A and slides thereon. Further, since the bending portion 61 is provided on the inner side peripheral surface of the hole 54, it is possible to largely restrain the problem, inherent in the prior art, of the chip caused on the cut surface of the inner side peripheral surface of the hole when the shutter opening/closing member 70 enters and engages with the hole 54 to open or close the shutter 5. Then, even if those operations are repeatedly conducted, the quantity of the chip can be reduced. Therefore, even if the shutter 5 is composed of the aluminum alloy of which the hardness is lower than the stainless steel used in the prior art, it is feasible to prevent the occurrence of inconveniences (such as sound skipping and a drop-out attributed to a damage to the disk) due to the metal powders scattered when in the recording/producing processes, and the chip problem can be obviated. Accordingly, the weight and the cost of the shutter can be reduced, which involves the use of the aluminum alloy and the like for shutter. This has such merit that both of the weight and the cost of the whole mini disk cartridge can be decreased.

Next, an example 1 and an example 2 will be described by way of specific examples of the present embodiment. The structures of the cartridge and of the shutter in these examples are the same as those in the embodiment illustrated in FIGS. 1, 2A to 2D and 11.

EXAMPLE 1

The shutter 5 for the mini disk (MD) shown in FIGS. 2A to 2D is composed of an aluminum alloy (of Al—Mg series, e.g., JIS5182) having an excellent strength. The resinous protection layer 60 is formed by baking finish over the outer surface of the shutter 5 by use of a polyester series resin to which a 10.5% lubricating agent by weight is added. An epoxy series and an acrylic series may also be usable as a resin material, and silicon and molybdenum disulfide may also be usable as a lubricating agent.

The shutter 5 is constructed by varying the thickness of the resinous protection layer to 3, 6, 9, 12, 15, 20 $\mu$m, and the cartridge as shown in FIG. 1 having the above shutter 5 is manufactured. There was implemented a test of how the cartridge is attached to and detached from the apparatus. It was confirmed in this attaching/detaching test that the protective film of the resinous protection layer 60 at the curved surface 61a of the hole 54 formed in the connection plate 53 of the shutter 5 shown in FIGS. 2C and 3, was chipped (exfoliated). This confirmation was made by checking the flowing of current, and the number of attaching/detaching operations till the current flowing was done. Table 1 shows a result of this test.

TABLE 1

| Thickness ($\mu$m) | 3 | 6 | 9 | 12 | 15 | 20 |
|---|---|---|---|---|---|---|
| Number of Attaching/Detaching Operations | x | x | x | ○ | ⊚ | ⊚ | where x: under 200 times (the surface was chipped)
○: over 500 times
⊚: over 500 times (damage to the surface is not conspicuous).

It can be understood from the result given above that a preferable thickness of the resinous protection layer 60 is more than 12 $\mu$m and, more preferably, more than 15 $\mu$m. Incidentally, a better result is obtained as a larger thickness is given to the resinous protection layer 60. When the resinous protection layer 60 is formed also on the outer surface of the upper plate 51, however, the shutter 5 must be made thin since, if such is too thick, such might result in a problem due to a decreased strength in the shutter, and therefore the preferable thickness is less than 40 $\mu$m. Alternatively, it may be reasoned that the plate thickness of the shutter needs to be over 0.185 mm, with the shutter slide area 12a of the upper case 1a shown in FIG. 1 being recessed 0.2 to 0.3 mm from the outer surface of the upper case 1a, this recessed portion must be deepened if the shutter 5 becomes thicker, and the case thickness in the shutter slide area 12a, if deepened, becomes too small, with the result that the strength of the case becomes insufficient. Further, the same problem may arise when the resinous protection layer 60 is formed also on the outer surface of the lower plate 51, and the thickness of the resinous protection layer 60 is preferably less than 40 $\mu$m.

EXAMPLE 2

Next, the example 2 has the same construction as the example 1, however, the content quantity of the lubricating agent in the resinous protection layer 60 is changed. To be specific, the shutter 5 is constructed in such a way that the thickness of the resinous protection layer 60 set to 20 $\mu$m, and the content quantity of the lubricating agent is changed to 2, 3, 5, 7, 10.5 and 12% by weight, and the cartridge as shown in FIG. 1 having the thus constructed shutter 5 is manufactured. There was implemented a test of how the cartridge is attached to and detached from the apparatus. As in the case of the example 1, it was confirmed in this attaching/detaching test that the protective film of a resinous protection layer was chipped (exfoliated). Table 2 shows a result of this test.

TABLE 1

| Content Quantity (WT %) | 2 | 3.5 | 7 | 10.5 | 12 |
|---|---|---|---|---|---|
| Number of Attaching/Detaching Operations | ○ | ⊚ | ⊚ | ⊚ | x |

It can be comprehended from the result given above that the lubricating agent is contained preferably within a range of 2 to 10.5% by weight and, more preferably, more than 3.5% by weight but less than 10.5% by weight. Note that if the content quantity of the lubricating agent increased over 10.5% by weight, an adhesion of the resinous protection layer to the shutter surface becomes low enough to exfoliate the layer. Further, a printing property with respect to the shutter also declines, and therefore the above increase is undesirable. Moreover, if smaller than 2% by weight, the sliding property on the resinous protection layer is unable to be enhanced.

The mini disk cartridge has been exemplified as the cartridge in this embodiment, however, the present invention is not limited to the MD cartridge and is applicable to other recording medium cartridges for a floppy disk and a tape recording medium and the like, further to a cleaning cartridge accommodating a cleaning member for cleaning a recording/reproducing head etc of the external apparatus. This cleaning member may also take a disk-like or a tape-like configuration. Furthermore, the hole is not confined to the rectangular shape but may assume other configurations. Moreover, the material of the shutter involves the use of aluminum, magnesium, titanium, beryllium, and light metal materials such as alloys of these metals, and may, in addition, be other metal materials and non-metallic materials such as polymer resins and the like.

Further, the resinous protection layer 60 may be provided at least on the slide area A of the connection plate 53 of the shutter 5 and may be provided over the entire surface 53a of the connection plate 53 and may further be provided also on the outer surface of the upper plate 51 and/or the lower plate 52. Still further, the resinous protection layer 60 may be formed on an inner surface (sliding on the case), thereby enhancing the sliding property both on the slide area 12a recessed from the outer surface of the upper case 1a and on the like slide area of the lower case 1b and also preventing the case from being chipped. There is, however, no possibility of being strongly rubbed, and hence the thickness thereof may be smaller than that of the resinous protection layer 60, for instance, approximately 2 $\mu$m may suffice.

According to the cartridge in this embodiment, even in the case where the shutter is composed of a light metallic material having low hardness such as aluminum and the like, it is feasible to minimize the possibility of the shutter being chipped easily with repetitive slides of the shutter upon the shutter opening/closing member of the apparatus even if the number of repetitions increases. It is therefore unnecessary to discharge metal powders and the like caused by the chips within the cartridge and the apparatus as well, and an adverse influence thereof can be restrained.

The present invention has been discussed by way of the embodiments but may be modified in many forms within the range of the gist of the present invention, and these modifications are not excluded from the scope of the present invention.

What is claimed is:

1. A cartridge for accommodating a tape-like member or a disk-like member, comprising:

a case;

an opening formed in said case;

a shutter, composed of a light metal material, for opening and closing said opening;

said shutter having a hole formed in the surface thereof, with which an external drive member is impingable to drive said shutter, wherein a resinous protection layer having a thickness of 12 $\mu$m to 40 $\mu$m is provided on a surface of said shutter upon which the drive member is impingable when engaging with said hole, and contains a lubricating agent within a range of 2 to 10.5% by weight, wherein the inner side peripheral surface of said hole comprises a continuous surface continuous with the shutter surface and has at least one bending surface in proximity with the hole, and said continuous surface is bent at said bending surface with respect to the shutter surface so as to have a substantially curved shape said continuous surface formed by said bending surface, extends in a direction perpendicular to said opening formed in said case.

2. A cartridge as claimed in claim 1, wherein such shutter includes a pair of flat plates positioned respectfully on opposite surfaces of said cartridge, and a connecting plate for connecting said flat plates and wherein said connecting plate has said hole provided therein.

3. A cartridge as claimed in claim 1, wherein said hole has a substantially rectangular shape.

4. A cartridge according to claim 3, which comprises a pair of substantially continuous surfaces provided on an inner side peripheral surface of said rectangular hole and which surfaces face one another.

5. A cartridge as claimed in claim 1, wherein a bending angle of the continuous surface is greater than 90° with respect to the shutter surface.

6. A cartridge as claimed in claim 1, wherein such shutter has an upper and lower plate and has a longitudinal extending connection plate having the shutter hole formed therein, wherein at least one of opposite sides of the hole extending substantially perpendicular to a longitudinal direction of the connection plate has a sliding surface formed thereon with said substantially curved shape for reducing chipping of a surface of the shutter in proximity with the shutter hole.

7. A cartridge for accommodating a tape-like member or a disk-like member, comprising:

a case, an opening formed in said case;

a shutter, composed of a light metal material, for opening and closing said opening, said shutter having a hole formed in the surface thereof, with which an external drive member engages is impingable to drive said shutter, wherein a resinous protection layer having a thickness of 12 $\mu$m to 40 $\mu$m is provided on a surface of said shutter upon which the drive member is impingable when engaging with said hole, and contains a lubricating agent within a range of 2 to 10.5% by weight, wherein an inner peripheral side of said hole, with which the drive member is impingable, comprises a continuous surface and has at least one bending portion in proximity with the hole; and a pair of substantially continuous surfaces provided on an inner side peripheral surface of said hole wherein said surfaces face one another said continuous surface formed by said bending portion, extends in a direction perpendicular to said opening formed in said case.

8. A cartridge for accommodating a tape-like member or a disk-like member, comprising:

a case;

an opening formed in said case;

a shutter, composed of a light metal material, for opening and closing said opening, said shutter having a hole formed in a surface thereof with which an external drive member engages is impingable to drive said shutter, wherein a resinous protection layer having a thickness of 12 $\mu$m to 40 $\mu$m is provided on a surface of said shutter upon which the drive member is impingable when engaging with said hole, and contains a lubricating agent within a range of 2 to 10.5% by weight, wherein an inner peripheral side of said hole, with which the drive member is impingable, comprises a continuous surface and has at least one bending portion in proximity with the hole and wherein a bending angle of the continuous surface is greater than 90° with respect to the shutter surface said continuous surface formed by said bending angle, extends in a direction perpendicular to said opening formed in said case.

* * * * *

UNITED STATES PATENT AND TRADEMARK OFFICE
CERTIFICATE OF CORRECTION

PATENT NO. : 6,542,459 B2
DATED : April 1, 2003
INVENTOR(S) : Miyazaki et al.

It is certified that error appears in the above-identified patent and that said Letters Patent is hereby corrected as shown below:

<u>Title page,</u>
Item [45] and Item [*] Notice should read as follows:
-- [45] Date of Patent: *Apr. 1, 2003
[*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Item [75], should read:
-- [75] Inventors: Yukio Miyazaki, Tokyo (JP): Masaru Ikebe, Tokyo (JP); Koichi Suzuki, Tokyo (JP) --

Signed and Sealed this

Twenty-ninth Day of July, 2003

JAMES E. ROGAN
*Director of the United States Patent and Trademark Office*